Apr. 3, 1923. 1,450,257
C. HUNT
METHOD OF CUTTING SHOE PART BLANKS
Filed Sept. 11, 1919

INVENTOR
Chester Hunt

Patented Apr. 3, 1923.

1,450,257

UNITED STATES PATENT OFFICE.

CHESTER HUNT, OF LYNN, MASSACHUSETTS, ASSIGNOR TO UNITED SHOE MACHINERY CORPORATION, OF PATERSON, NEW JERSEY, A CORPORATION OF NEW JERSEY.

METHOD OF CUTTING SHOE-PART BLANKS.

Application filed September 11, 1919. Serial No. 323,165.

*To all whom it may concern:*

Be it known that I, CHESTER HUNT, a citizen of the United States, residing at Lynn, in the county of Essex and State of Massachusetts, have invented certain Improvements in Methods of Cutting Shoe-Part Blanks, of which the following description, in connection with the accompanying drawings, is a specification, like reference characters on the drawings indicating like parts in the several figures.

This invention relates to the manufacture of shoes and more particularly to improvements in methods and means employed in the cutting of skins in the production of the uppers of shoes.

It has heretofore been the usual practice of cutters in shoe factories to examine each skin, in many cases in a somewhat perfunctory manner, preliminarily to cutting operations thereon, to decide upon the location of the first three or four or, possibly, half-dozen blanks to be cut from the given skin. The cutter then proceeds to cut out these blanks according to a plan which at the best is more or less vaguely conceived and which is subject to alterations because of hasty decisions and incorrect calculations. Moreover in planning skins for cutting there is great difficulty in the detection and proper assessment and disposition of the large number of "variables" in skins. Perhaps the most important "variables" are those which relate to the texture and color of the skin and to the direction and extent of the stretch of different portions of the skin under strains such as those incidental to pulling-over and lasting operations. The occurrence of tan burns, grub marks and slaughter cuts affect the availability of different portions of the skin. Furthermore, skins are uneven in weight and some portions may be heavy and meaty while others are thin and fine-grained. It thus becomes clear that the cutter may be called upon to consider all or a majority of these "variables" in the cutting of a given skin, and that it is impossible to obtain even an approximation of the maximum value from a skin in cutting it into shoe part blanks unless during the planning careful consideration is given to all or a majority of these factors or variables with relation to the shoe parts which have requirements which must be matched with the proper qualities residing in the various parts of the skin. As heretofore practiced, the cutting of skins for the uppers of shoes was a more or less haphazard affair, and it was only an element of good luck which enabled a cutter occasionally to approach closely the maximum skin value for any particular cutting, since it is practically impossible for even a good cutter to secure the best results by proceeding to cut selected parts before the subsequent cuts are planned.

It is an object of this invention to provide an improved method of cutting skins with the end in view of obtaining the maximum value of skins in the shoe part blanks cut therefrom.

In the practice of the invention a novel pattern is employed, the latter having the shape and size of the die which is subsequently utilized in cutting the blank from the skin. Hence a set of these patterns is provided corresponding to the individual dies of the set commonly employed in operations with the commercial clicking machine. Each pattern is provided with means for registering its outline on the skin and in the illustrative construction, this means comprises a relatively sharp or well-defined edge capable of carrying an ink or other marking preparation and having the outline of a shoe part blank. Preferably the pattern is supported with its edge out of contact with the skin while it is being moved over the skin to the desired location. When located according to the best judgment of the operative, the pattern is caused to make a mark on the skin outlining the blank. It is then removed and other patterns used to indicate the location and outline of other shoe part blanks until the whole skin is planned. Preferably the pattern is formed from a narrow band of metal or other suitable material which is shaped to the outline of the corresponding shoe part blank and has the great advantage over all patterns now used in shoe factories of exposing to the view of the operative the portion of the skin within the outlining edge of the pattern as well as that without and immediately adjacent to said edge. Consequently the pattern may be located readily with respect to such "variables" as scars, perforations, tan burns, and slaughter cuts, and if such a blemish be small it may be divided between the edge portions of two or more blanks, since such edge portions are turned up and overlapped in securing the blanks together in stitching and lasting operations. For this reason also, it is often permissible to overlap one pattern outline slightly upon another, and an advantage of the present method is that this can be accomplished readily and with the desired accuracy by the use of the open pattern thus conserving stock. A very important feature of the invention resides in the outlining of a blank by means of a pattern which is then removed so that there is no interference with subsequent outlining operations upon portions of the skin closely adjacent to the outlined portion or with such manipulation of the skin as may be desirable at any time during the planning operations.

In one aspect the invention contemplates, as a routine operation in the quantity production of shoe part blanks, the successive marking of the locations of shoe part blanks on each skin until all or the greater part of the skin is planned and before any cutting operation is performed to separate a blank or blanks from the skin.

In another aspect the invention resides in the application of a pattern to a skin so as to cause it to leave its outline, and in its removal from the skin, and in the repetition of these operations with patterns until the skin is planned as a preliminary to blank cutting operations.

In still another aspect the invention resides in the improved pattern above described as especially useful in practicing the novel method herein disclosed. It is to be understood, however, that the novel pattern is capable also of other applications and uses. Conveniently the means for supporting the pattern above the skin until it is located in the desired relation thereto is individual to each pattern and may be applied thereto as an attachment or may be built into the pattern. Preferably the said means is embodied in spring members which yield to pressure, thus permitting the operative to force the pattern down on to the work after it has been properly located.

Other objects and advantages of the invention will be described in the following detailed description and pointed out in the claims.

In the drawings:—

Figure 1:
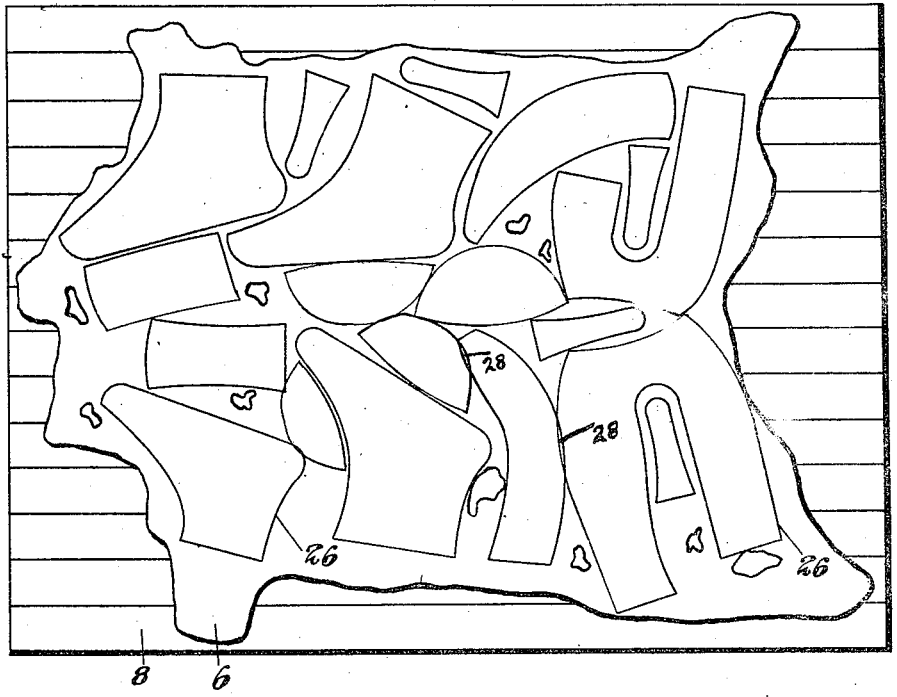
Fig. 1 is a plan view of a skin on a supporting table with shoe part blanks indicated in outline on the skin.

In the practice of the invention a skin 6 is placed upon a supporting table like that shown at 8 in Fig. 1 of the drawings and is smoothed out and carefully examined preparatory to planning the same for cutting operations. As indicated above the examination will include a search for such defects as perforations, slaughter cuts, grub marks and tan burns so that they may be entirely avoided in locating the shoe part blanks for the better parts of shoe uppers. The examination includes also a consideration of the texture of the various portions of the skin and also of the surface coloring so that corresponding parts for the same shoe may be matched both in quality and in appearance. The skin is also tested for the amount and direction of the stretch of the material, the flanks usually showing the greatest amount of stretch which is present to a considerably less degree along the back or central portions of the skin. The direction and amount of stretch of pieces of the skin is of the utmost importance. For example, if this factor be disregarded, a tip or vamp which is subjected to considerable strain during pulling over and lasting operations may, by these operations, be so distorted as to mar the appearance of the shoe. Furthermore, various portions of the skin differ considerably in weight, some portions being thick and meaty, while other portions are thinned or pipey. In planning the skin, the best portions are selected for the vamps and quarters of the shoe uppers and particularly for the tips which must be of especially good quality because of their location in the shoe. The portions of lesser value are utilized for foxings, stays and tongues. In order that the skin may be planned to the best advantage all of the variables above noted should be considered and the entire skin planned before any cutting operation is performed.

Figure 3:
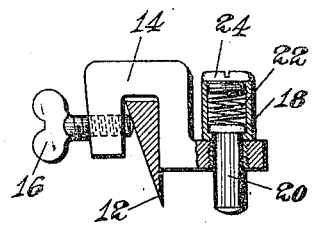
Fig. 3 is a section of the pattern showing a means for suspending the pattern above the work.
Figure 2:
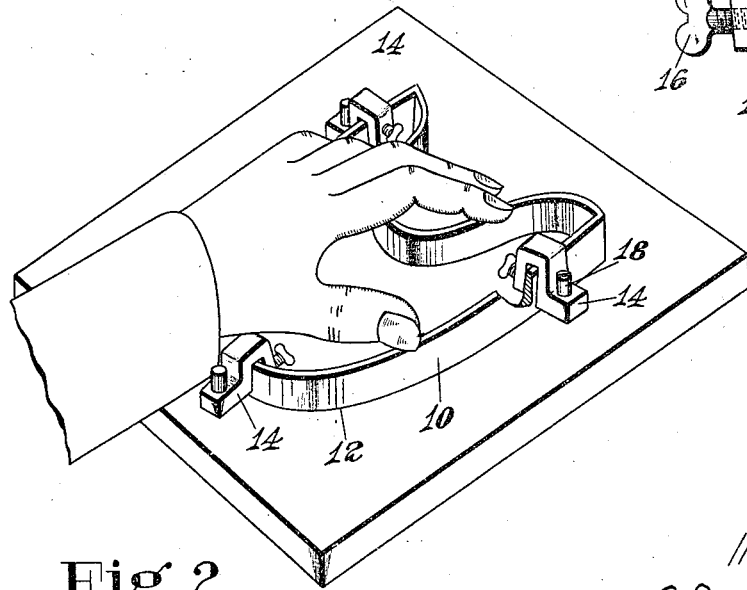
Fig. 2 is a view in perspective of the improved pattern illustrating the method of using the same.

Preferably the operator makes use of the pattern 10 shown in Fig. 2 of the drawings which consists of a band of metal or other suitable material shaped into the form of a cutting die and having a relatively sharp edge 12 which is capable of receiving and holding a coloring substance preferably of the consistency of printers' ink. Mounted on the pattern 10 are supporting devices, one of which is shown in detail in Fig. 3 of the drawings. In the illustrated construction an attaching clamp member 14 is provided with a set screw 16 so that the member may be adjusted wherever desired on the pattern and secured in position, the clamp member further carrying a socket member 18, in which is slidably mounted a pin or stud 20 of such a length that when fully projected, its lower end extends below the plane of the sharp edge of the pattern. Arranged within the socket is a spring 22 which operates to hold the pin yieldingly projected so that, upon pressure upon the pattern, the pin may be forced back into the socket, thus permitting the edge of the pattern to come into contact with the work. Preferably the socket is closed by a screw threaded member 24 so that the spring and pin may be readily introduced into the socket or removed as occasion may require. Ordinarily each pattern will be provided with three of the supporting pins 20 so disposed as to maintain the edge of the pattern out of contact with the skin until the pattern has been located in the desired position. The patterns heretofore provided for use in cutting out the blanks from skins are flat pieces of material having an edge contour corresponding to the shape or contour of the desired shoe part blank and, when placed on the skin, they cover entirely the material which will form the desired blank, so that it is difficult properly to position the pattern with respect to the variables above described. For instance, where it is desired to locate the pattern partially over a blemish such as a perforation or a scar, it is difficult to do so with the ordinary pattern because the latter covers the material within the outline of the proposed blank. On the other hand, with the novel pattern of this invention, the material or portion of the skin inside of the pattern is visible to the operator as well as the portions outside of the pattern and closely adjacent thereto, so that the pattern may be readily located in the desired position.

In the practice of the method, the operator having at his command a set of patterns corresponding to the set of dies ordinarily employed in cutting skins with commercial clicking machines, selects a pattern and presses it upon an inked pad so as to apply coloring matter to the edge of the pattern. The latter is then placed upon the skin in approximately the desired position and is then adjusted to the exact position desired by the operator, it being possible to shift the pattern on the skin without danger of outlining the blank thereon since the edge of the pattern is supported out of contact with the skin by means of the supporting pins 20. When the pattern has been positioned as desired, a relatively light pressure downwardly on the pattern forces the edge carrying the coloring material into contact with the skin, thus outlining the blank 26 thereon, as shown in Fig. 1 of the drawings. The pattern is then removed and another pattern selected and the operation repeated as above described. Since the first pattern is removed after leaving its outline on the skin, there is nothing to interfere with the proper positioning of any pattern subsequently selected and placed on the skin. Moreover, it is possible slightly to overlap one shoe part outline upon another, as indicated at 28 in Fig. 1, or to include in the edge portion of the blank the small portion of a perforation or other blemish in the skin, since, as pointed out, the pattern may be adjusted with the desired accuracy as all portions of the skin are practically open to inspection while positioning the pattern. Many of the skins contain folds or wrinkles which manifest themselves when the skin is placed upon a flat surface and smoothed out in the attempt to bring all portions of the skin into the same plane. Ordinarily in placing patterns or dies on such a skin the said folds will be all chased into one portion of the skin, thus making it difficult to plan this wrinkled or folded portion by means of the ordinary pattern. With the novel pattern herein disclosed, no such difficulty arises since the pattern is removed after it has left its outline on the skin and hence the folds or wrinkles referred to may be chased into those portions of the skin which have already been planned, thus leaving the unplanned portion smooth and free of the folds and in the condition to have patterns applied thereto with entirely satisfactory results. If the result of the planning be considered unsatisfactory, the marks outlining the blanks may be removed and the skin submitted to a re-planning operation. Finally after the complete planning of the skin it is cut into blanks as indicated by use of the corresponding dies, this latter operation being usually performed by one who is skilled as a cutter, that is, in the manipulation of dies and in the operation of the clicking machine, the method having the advantage of employing skilled operatives in the planning of skins and others skilled in cutting operations for cutting out the blanks as planned by the former.

Having described the invention, what I claim as new and desire to secure by Letters Patent of the United States is:—

1. That improvement in the art of making shoe part blanks from a skin which consists in placing individual patterns successively upon a skin, outlining each pattern on the skin to mark the location of a blank before another pattern is applied to the skin, repeating the operation until the entire skin is planned, and subsequently cutting the skin according to the plan recorded thereon.

2. That improvement in the art of making shoe part blanks from a skin which consists in placing a pattern in a selected position upon a skin, manipulating the pattern to cause it to leave its outline upon the skin, before placing another pattern thereon, repeating the operations described until the skin or any desired portion thereof is planned, and then cutting blanks from the skin as outlined thereon.

3. That improvement in the art of making shoe-part blanks which comprises positioning a pattern in a desired location on a skin, outlining the pattern on the skin before applying another pattern to the skin, positioning another pattern with its outlining edge overlapping the edge of a previously made outline, outlining the second pattern on the skin, repeating these steps so as to plan the entire skin before any cutting operation is performed, and then cutting the blanks from the skin according to the plan recorded thereon.

4. That improvement in the art of making shoe part blanks from a skin which comprises positioning the skin on a support in extended condition, supporting a pattern over the skin and moving it to the desired location, causing the pattern to leave its outline upon the skin in the selected location before placing another pattern on the skin, removing the pattern from the skin, repeating the operation with patterns which are successively placed over the skin and caused to leave their outlines thereon until the entire skin is planned for cutting, and subsequently cutting the skin according to the plan recorded thereon.

5. That improvement in the art of making shoe part blanks from the skin which consists in applying coloring material to the outlining edge of a pattern, supporting the pattern over the skin so that the edge of the pattern is kept out of contact with the skin until the pattern is located in the desired position, causing the edge of the single pattern on the skin to contact with the skin and thus leave the outline of the pattern in color on the skin, removing the pattern, repeating the operations just described until the entire skin is planned, and subsequently cutting the skin according to the plan recorded thereon.

6. A pattern for outlining shoe part blanks comprising a band of metal or other suitable material shaped into the form of a shoe part blank and open and unobstructed at top and bottom and having a relatively sharp edge designed to carry a coloring substance, and means for supporting the pattern above the work.

7. A pattern for shoe part blanks and means for supporting the pattern above the work comprising a plurality of spring pressed pins located in spaced relation on the pattern and projecting below the edge of the pattern so as to support the latter above the work.

8. A pattern for shoe part blanks having supporting points consisting of spring pressed pins arranged to project below the edge of the pattern to support the latter above the work, and means for securing the supporting pins to the pattern so as to be adjustable toward and from each other.

9. A pattern for outlining shoe part blanks on skins comprising a band of suitable material shaped into the form of a shoe part blank and open and unobstructed at top and bottom so that the material being operated upon can be viewed through the pattern, and having a relatively fine edge designed to contact with the skin without injury to the same.

10. A pattern for outlining shoe part blanks comprising a band of suitable material shaped into the form of a shoe part blank and open and unobstructed at top and bottom so that the material to be operated upon can be viewed through the pattern, said pattern having a relatively thin non-cutting edge designed to carry a coloring substance.

In testimony whereof I have signed my name to this specification.

CHESTER HUNT.